United States Patent
Ziaeefard et al.

(10) Patent No.: US 11,599,749 B1
(45) Date of Patent: Mar. 7, 2023

(54) METHOD OF AND SYSTEM FOR EXPLAINABLE KNOWLEDGE-BASED VISUAL QUESTION ANSWERING

(71) Applicant: THALES SA, Courbevoie (FR)

(72) Inventors: Maryam Ziaeefard, Montreal (CA); Freddy Lecue, Montreal (CA)

(73) Assignee: THALES SA, Courbevoie (FR)

( * ) Notice: Subject to any disclaimer, the term of this patent is extended or adjusted under 35 U.S.C. 154(b) by 124 days.

(21) Appl. No.: 17/130,599

(22) Filed: Dec. 22, 2020

Related U.S. Application Data

(60) Provisional application No. 62/953,128, filed on Dec. 23, 2019.

(51) Int. Cl.

| | | |
|---|---|---|
| *G06K 9/62* | (2022.01) | |
| *G06N 3/04* | (2006.01) | |
| *G06N 3/08* | (2006.01) | |
| *G06V 10/40* | (2022.01) | |
| *G06V 30/262* | (2022.01) | |

(52) U.S. Cl.
CPC ......... *G06K 9/6256* (2013.01); *G06K 9/6267* (2013.01); *G06N 3/0445* (2013.01); *G06N 3/0454* (2013.01); *G06N 3/08* (2013.01); *G06V 10/40* (2022.01); *G06V 30/274* (2022.01)

(58) Field of Classification Search
CPC .. G06K 9/6256; G06K 9/6267; G06K 9/6296; G06K 9/6232; G06K 9/6215; G06K 9/6218; G06K 9/6222; G06N 3/0445; G06N 3/0454; G06N 3/08; G06N 5/022; G06N 20/00; G06N 5/04; G06N 3/0427; G06N 3/0481; G06N 3/084; G06N 5/025; G06N 5/02; G06N 7/005; G06V 10/40; G06V 30/274; G06V 10/82; G06V 10/764; G06V 10/84; G06V 10/426; G06V 10/774;

(Continued)

(56) References Cited

U.S. PATENT DOCUMENTS

| | | | | |
|---|---|---|---|---|
| 6,847,980 B1 * | 1/2005 | Benitez | ................. | G06F 16/288 707/916 |
| 10,140,286 B2 * | 11/2018 | Durr | ................... | G06F 16/9027 |

(Continued)

OTHER PUBLICATIONS

Qi Wu et al., Image Captioning and Visual Question Answering Based on Attributes and External Knowledge, IJCAI 2017.
(Continued)

*Primary Examiner* — Michael S Osinski
(74) *Attorney, Agent, or Firm* — Hauptman Ham, LLP

(57) ABSTRACT

A method and a system for generating an augmented scene graph of an image and for training an explainable knowledge based (KB) visual question answering (VQA) machine learning (ML) model are provided. A scene graph encoding spatial and semantic features of objects and relations between objects in the image is obtained. An augmented scene graph is generated by embedding a knowledge graph to enhance the scene graph. An embedded set of questions and associated answers related to the image are obtained. The KB VQA ML model is trained to provide an answer to a given question related to the image based on the augmented scene graph and the embedded set of questions and associated answers. The KB VQA ML model is trained to retrieve a subgraph linking the question and the associated answer as a potential explanation for the answer.

20 Claims, 6 Drawing Sheets

(58) Field of Classification Search
CPC .. G06V 10/467; G06V 10/776; G06V 10/806; G06V 20/70; G06V 20/56; G06V 20/46
See application file for complete search history.

(56) References Cited

U.S. PATENT DOCUMENTS

| | | | | |
|---|---|---|---|---|
| 10,642,891 | B2* | 5/2020 | Choe | G06F 16/71 |
| 10,665,030 | B1* | 5/2020 | Shekhar | G06F 40/30 |
| 11,120,093 | B1* | 9/2021 | Cuan | G06V 10/40 |
| 11,301,725 | B2* | 4/2022 | Liu | G06V 10/84 |
| 11,361,186 | B2* | 6/2022 | Liu | G06V 10/426 |
| 2014/0181000 | A1* | 6/2014 | Syed | G06N 5/04 706/56 |
| 2017/0193393 | A1* | 7/2017 | Contractor | G06N 5/022 |
| 2017/0220903 | A1* | 8/2017 | Hertzmann | G06K 9/6254 |
| 2018/0052885 | A1* | 2/2018 | Gaskill | G06N 5/04 |
| 2019/0122111 | A1* | 4/2019 | Min | G06N 3/0427 |
| 2019/0171864 | A1* | 6/2019 | Nakayama | G06V 10/764 |
| 2020/0081445 | A1* | 3/2020 | Stetson | G05D 1/0221 |
| 2020/0279151 | A1* | 9/2020 | Li | G06N 5/022 |
| 2020/0401835 | A1* | 12/2020 | Zhao | G06V 10/764 |
| 2021/0125344 | A1* | 4/2021 | Zhang | G06K 9/6218 |
| 2021/0133461 | A1* | 5/2021 | Ren | G06T 7/11 |
| 2021/0192274 | A1* | 6/2021 | Liu | G06K 9/6289 |
| 2021/0209356 | A1* | 7/2021 | Wang | G06V 30/40 |
| 2021/0232770 | A1* | 7/2021 | Lin | G06N 20/00 |
| 2021/0264216 | A1* | 8/2021 | Liu | G06N 3/08 |
| 2021/0357791 | A1* | 11/2021 | Loginov | G06F 16/904 |
| 2021/0374489 | A1* | 12/2021 | Prakash | G06V 20/70 |
| 2022/0245188 | A1* | 8/2022 | Kappel | G06N 3/08 |
| 2022/0246244 | A1* | 8/2022 | Kappel | G06N 3/0445 |

OTHER PUBLICATIONS

Peng Wang et al., FVQA: Fact-Based Visual Question Answering, IEEE Transactions on Pattern Analysis & Machine Intelligence 2018.

Medhini Narasimhan et al., Out of the Box: Reasoning with Graph Convolution Nets for Factual Visual Question Answering, CoRR abs/1811.00538, 2018.

Shaoqing Ren et al., Faster R-CNN: Towards Real-Time Object Detection with Region Proposal Networks, CoRR abs/1506.01497, 2015.

Sanghyun Woo et al., LinkNet: Relational Embedding for Scene Graph, CoRR abs/1811.06410, 2018.

Matthew E. Peters, et al., Deep contextualized word representations, CoRR abs/1802.05365, 2018.

* cited by examiner

METHOD OF AND SYSTEM FOR EXPLAINABLE KNOWLEDGE-BASED VISUAL QUESTION ANSWERING

CROSS-REFERENCE TO RELATED APPLICATIONS

The present application claims priority on U.S. Provisional Patent Application No. 62/953,128 filed on Dec. 23, 2019.

FIELD

The present technology relates to machine learning (ML) in general and more specifically to methods and systems for training an explainable knowledge-based visual question answering model.

BACKGROUND

Improvements in computer hardware and technology coupled with the multiplication of connected mobile electronic devices have spiked interest in developing solutions for task automatization, outcome prediction, information classification and learning from experience, resulting in the field of machine learning. Machine learning, closely related to data mining, computational statistics and optimization, explores the study and construction of algorithms that can learn from and make predictions on data.

The field of machine learning has evolved extensively in the last decade, giving rise to self-driving cars, speech recognition, image recognition, personalization, and understanding of the human genome. In addition, machine learning enhances different information retrieval activities, such as document searching, collaborative filtering, sentiment analysis, and so forth.

Machine learning (ML) may generally be divided into broad categories such as supervised learning, unsupervised learning and reinforcement learning. Supervised learning consists of presenting a machine learning model with training data consisting of inputs and outputs labelled by assessors, where the goal is to train the machine learning model such that it learns a general rule for mapping inputs to outputs. Unsupervised learning consists of presenting the machine learning model with unlabeled data, where the goal is for the machine learning model to find a structure or hidden patterns in the data. Reinforcement learning consists of having an algorithm evolving in a dynamic environment without providing the algorithm with labeled data or corrections.

In the context of machine learning, visual question answering (VQA) is a research area about building models to answer questions presented in images and videos. VQA systems requires machine learning techniques involving image recognition and natural language processing, where spatial, image, and textual features are combined in a manner to answer a question about an image. VQA models generally focus on questions which are answerable by direct analysis of the question and image alone.

SUMMARY

It is an object of one or more embodiments of the present technology to improve at least one of the limitations present in the prior art. One or more embodiments of the present technology may provide and/or broaden the scope of approaches to and/or methods of achieving the aims and objects of the present technology.

One or more embodiments of the present technology have been developed based on developers' appreciation that VQA ML models focus on questions which are answerable by direct analysis, and may not be able to address questions which require basic factual knowledge and/or "common sense" from a human point of view. Developers have also appreciated that the behavior of VQA models in answering the questions is not explained, i.e. how the VQA model "thinks" to provide the answer for a question about an image is not known. However, in some cases, an answer provided by a VQA model in response to a question may not be correct, and its accuracy may be difficult to assess due to the lack of interpretability, i.e. the reasoning of the VQA model may not be available for interpretation.

Developers of the present technology have envisioned a knowledge-based (KB) VQA ML model which is trained to learn factual and contextual information and potential relations between detected objects in images by leveraging information present in an external knowledge source such as a knowledge graph. The KB VQA ML model may thus learn to improve relational representations between detected objects in an image and/or between concepts in the questions and the detected objects and provide information about how the answer can be derived from the question. The KB VQA ML model may learn to retrieve information relevant to the question in the form of subgraphs, and provide the subgraphs as potential explanations to answers. By providing subgraphs as potential explanations, the behavior of the KB VQA ML model can be interpretable. Further, with simple queries, reasoning, or link prediction, the KB VQA ML model may provide direct answers to general questions that do not depend on a specific image.

Such a KB VQA ML model may be used for instance for explaining in-flight threat detections, actions performed by autonomous vehicles, or for medical diagnosis for example.

Thus, one or more embodiments of the present technology are directed to a method of and a system for knowledge-based visual question answering.

In accordance with a broad aspect of the present technology, there is disclosed a method for generating an augmented scene graph of an image. The method is executed by a processor, the processor having access to a machine learning model having been trained to generate scene graph of images based on features thereof. The method comprises obtaining, via the machine learning model, a scene graph of an image, the scene graph comprising a set of objects having been labelled in the image, the scene graph encoding semantic features and spatial features of each labelled object of the set of labelled objects in the image, and at least one first type of relation between at least two labelled objects of the set of labelled objects. The method comprises obtaining, from a knowledge graph, based on at least a portion of the scene graph, a set of additional objects, embedding, using the machine learning model, the obtained set of additional objects to obtain a set of additional embedded objects. The method comprises generating, using the machine learning model, the augmented scene graph by enhancing the scene graph with the set of additional embedded objects, the augmented scene graph thereby encoding at least one additional type of relation between at least one labelled object of the set of labelled object and at least one additional object of the set of additional objects, the at least one additional type of relation being a second type of relation.

In one or more embodiments, there is disclosed a method for training a visual question answering machine learning model based on the augmented scene graph, where the machine learning model is a first machine learning model, and the processor has access to a second machine learning model having been trained to generate word embeddings, and the visual question answering machine learning model. The method further comprises obtaining a set of questions and an associated set of answers related to the image, embedding, using the second machine learning model, the obtained set of questions and the associated set of answers to obtain a set of embedded questions and a set of associated embedded answers, and training the visual question answering machine learning model to provide an answer in response to a given question related to the image based on the augmented scene graph, the obtained set of embedded questions, and the set of associated embedded answers.

In one or more embodiments of the method, the method further comprises prior to the obtaining of the scene graph of the image, obtaining the image, the image having image features, and detecting, using the first machine learning model, based on the image features, the set of labelled objects, each labelled object having respective spatial features, respective semantic features, and respective object features, and embedding, using the second machine learning model, based on the respective spatial features, the respective semantic features, and the respective object features, the set of labelled objects to obtain the scene graph of the image.

In one or more embodiments of the method, the semantic features comprise an object label, and an object type, and the spatial features comprise a size of the object, and a location of the object.

In one or more embodiments of the method, the second type of relation is different from the first type of relation.

In one or more embodiments of the method, the first type of relation comprises a spatial relation, and the second type of relation comprises a semantic relation.

In one or more embodiments of the method, the augmented scene graph of the image further encodes respective object features of each labelled object, the respective object features comprising respective visual features.

In one or more embodiments of the method, a given relation between objects in a pair of objects is represented as an edge, the edge having an edge label indicative of a type of relation.

In one or more embodiments of the method, the training of the visual question answering machine learning model to provide the answer in response to the given question comprises training the visual question answering machine learning model to retrieve at least one subgraph of the augmented scene graph, the subgraph comprising the answer.

In one or more embodiments of the method, the method further comprises providing an indication of the at least one subgraph as a potential explanation for the answer.

In one or more embodiments of the method, the set of additional objects comprises object attributes of the at least one labelled object in the set of labelled objects.

In one or more embodiments of the method, the method further comprises repeating the method for a set of images, each image being associated with a respective set of questions and an associated set of answers.

In one or more embodiments of the method, the method further comprises the first machine learning model comprises a deep convolutional neural network and a region proposal network (RPN).

In one or more embodiments of the method, the method further comprises the second machine learning model comprises a long short-term memory (LSTM) network.

In one or more embodiments of the method, the visual question answering machine learning model comprises a deep neural network.

In accordance with a broad aspect of the present technology, there is disclosed a method for training a visual question answering machine learning model, the method being executed by a processor, the processor having access to a first machine learning model having been trained to generate scene graph of images based on features thereof, a second machine learning model having been trained to generate word embeddings, and the visual question answering machine learning model. The method comprises obtaining, via the first machine learning model, a scene graph of an image, the scene graph comprising a set of objects having been labelled in the image, the scene graph encoding semantic information and spatial information of each labelled object of the set of labelled objects in the image, and at least one type of relation between at least two labelled objects of the set of labelled objects, obtaining, from a knowledge graph, based on at least a portion of the scene graph, a set of additional objects, embedding, using the first machine learning model, the obtained set of additional objects to obtain a set of additional embedded objects, and generating, using the first machine learning model, the augmented scene graph by enhancing the scene graph with the set of additional embedded objects, the augmented scene graph thereby encoding at least one additional type of relation between at least one labelled object of the set of labelled object and at least one additional object of the set of additional objects. The method comprises obtaining, via the second machine learning model, a set of embedded questions and a set of associated embedded answers, the set of embedded questions and the set of associated embedded answers having been generated from a set of questions and a set of associated answers related to the image. The method comprises training the visual question answering machine learning model to provide an answer in response to a given question related to the image based on the augmented scene graph, the set of embedded questions, and the set of associated embedded answers.

In accordance with a broad aspect of the present technology, there is disclosed a method for generating an augmented scene graph of an image, the method being executed by a processor, the processor having access to a machine learning model having been trained to generate scene graph of images based on features thereof. The method comprises obtaining, via the machine learning model, a scene graph of an image, the scene graph comprising a set of objects having been labelled in the image, the scene graph encoding semantic features and spatial features of each labelled object of the set of labelled objects in the image, and semantic features and spatial features of each labelled object of the set of labelled objects in the image, and at least one type of relation between at least two labelled objects of the set of labelled objects, the at least one type of relation being at least one of a semantic relation and a spatial relation. The method comprises obtaining, from a knowledge graph, based on at least a portion of the scene graph, a set of additional objects, embedding, using the machine learning model, the obtained set of additional objects to obtain a set of additional embedded objects. The method comprises generating, using the machine learning model, the augmented scene graph by enhancing the scene graph with the set of additional embedded objects, the augmented scene graph thereby encoding at least one additional type of relation between at least one labelled object of the set of labelled object and at least one additional object of the set of additional objects, relation being at least one of a semantic relation and a spatial relation.

In accordance with a broad aspect of the present technology, there is disclosed a system for generating an augmented scene graph of an image, the system comprising a processor having access to a machine learning model having been trained to generate scene graph of images based on features thereof. The processor is operatively connected to a non-transitory storage medium comprising instructions. The processor, upon executing the instructions, is configured for obtaining, via the machine learning model, a scene graph of an image, the scene graph comprising a set of objects having been labelled in the image, the scene graph encoding semantic features and spatial features of each labelled object of the set of labelled objects in the image, and at least one first type of relation between at least two labelled objects of the set of labelled objects. The processor is configured for obtaining, from a knowledge graph, based on at least a portion of the scene graph, a set of additional objects, embedding, using the machine learning model, the obtained set of additional objects to obtain a set of additional embedded objects, and generating, using the machine learning model, the augmented scene graph by enhancing the scene graph with the set of additional embedded objects, the augmented scene graph thereby encoding at least one additional type of relation between at least one labelled object of the set of labelled object and at least one additional object of the set of additional objects, the at least one additional type of relation being a second type of relation.

In one or more embodiments of the system, the system is used for training a visual question answering machine learning model based on the augmented scene graph, the machine learning model is a first machine learning model, the processor has access to a second machine learning model having been trained to generate word embeddings, and the visual question answering machine learning model, and the processor is configured for obtaining a set of questions and an associated set of answers related to the image, embedding, using the second machine learning model, the obtained set of questions and the associated set of answers to obtain a set of embedded questions and a set of associated embedded answers, and training the visual question answering machine learning model to provide an answer in response to a given question related to the image based on the augmented scene graph, the obtained set of embedded questions, and the set of associated embedded answers.

In one or more embodiments of the system, the processor is further configured for, prior to the obtaining of the scene graph of the image, obtaining the image, the image having image features, and detecting, using the first machine learning model, based on the image features, the set of labelled objects, each labelled object having respective spatial features, respective semantic features, and respective object features, and embedding, using the second machine learning model, based on the respective spatial features, the respective semantic features, and the respective object features, the set of labelled objects to obtain the scene graph of the image.

In one or more embodiments of the system, the semantic features comprise an object label, and an object type, and the spatial features comprise a size of the object, and a location of the object.

In one or more embodiments of the system, the second type of relation is different from the first type of relation.

In one or more embodiments of the system, the first type of relation comprises a spatial relation, and the second type of relation comprises a semantic relation.

In one or more embodiments of the system, the augmented scene graph of the image further encodes respective object features of each labelled object, the respective object features comprising respective visual features.

In one or more embodiments of the system, a given relation between objects in a pair of objects is represented as an edge, the edge having an edge label indicative of a type of relation.

In one or more embodiments of the system, the training of the visual question answering machine learning model to provide the answer in response to the given question comprises training the visual question answering machine learning model to retrieve at least one subgraph of the augmented scene graph, the subgraph comprising the answer.

In one or more embodiments of the system, the processor is further configured for providing an indication of the at least one subgraph as a potential explanation for the answer.

In one or more embodiments of the system, the set of additional objects comprises object attributes of the at least one labelled object in the set of labelled objects.

In one or more embodiments of the system, the processor is further configured for repeating the system for a set of images, each image being associated with a respective set of questions and an associated set of answers.

In one or more embodiments of the system, the processor is further configured for the first machine learning model comprises a deep convolutional neural network and a region proposal network (RPN).

In one or more embodiments of the system, the second machine learning model comprises a long short-term memory (LS™) network.

In one or more embodiments of the system, the visual question answering machine learning model comprises a deep neural network.

In accordance with a broad aspect of the present technology, there is disclosed a system for training a visual question answering machine learning model. The system comprises a processor having access to a first machine learning model having been trained to generate scene graph of images based on features thereof, a second machine learning model having been trained to generate word embeddings, and the visual question answering machine learning model. The processor is operatively connected to a non-transitory storage medium comprising instructions. The processor, upon executing the instructions, is configured for obtaining, via the first machine learning model, a scene graph of an image, the scene graph comprising a set of objects having been labelled in the image, the scene graph encoding semantic information and spatial information of each labelled object of the set of labelled objects in the image, and at least one type of relation between at least two labelled objects of the set of labelled objects, obtaining, from a knowledge graph, based on at least a portion of the scene graph, a set of additional objects, embedding, using the first machine learning model, the obtained set of additional objects to obtain a set of additional embedded objects, and generating, using the first machine learning model, the augmented scene graph by enhancing the scene graph with the set of additional embedded objects, the augmented scene graph thereby encoding at least one additional type of relation between at least one labelled object of the set of labelled object and at least one additional object of the set of additional objects. obtaining, via the second machine learning model, a set of embedded questions and a set of associated embedded answers, the set of embedded questions and the set of associated embedded answers having been generated from a set of questions and a set of associated answers related to the image, and training the visual question answering machine learning model to provide an answer in response to a given question related to the image based on the augmented scene graph, the set of embedded questions, and the set of associated embedded answers.

In accordance with a broad aspect of the present technology, there is disclosed a system for generating an augmented scene graph of an image. The system comprises a processor having access to a machine learning model having been trained to generate scene graph of images based on features thereof. The processor is operatively connected to a non-transitory storage medium comprising instructions. The processor, upon executing the instructions is configured for obtaining, via the machine learning model, a scene graph of an image, the scene graph comprising a set of objects having been labelled in the image, the scene graph encoding semantic features and spatial features of each labelled object of the set of labelled objects in the image, at least one type of relation between at least two labelled objects of the set of labelled objects, the at least one type of relation being at least one of a semantic relation and a spatial relation. The processor is configured for obtaining, from a knowledge graph, based on at least a portion of the scene graph, a set of additional objects, embedding, using the machine learning model, the obtained set of additional objects to obtain a set of additional embedded objects, and generating, using the machine learning model, the augmented scene graph by enhancing the scene graph with the set of additional embedded objects, the augmented scene graph thereby encoding at least one additional type of relation between at least one labelled object of the set of labelled object and at least one additional object of the set of additional objects, the at least one additional type of relation being at least one of a semantic relation and a spatial relation.

Definitions

Machine Learning (ML) Models

A machine learning (ML) algorithm is a process or sets of procedures that helps a mathematical model adapt to data given an objective. A ML algorithm normally specifies the way the feedback is used to enable the model to learn the appropriate mapping from input to output. The model specifies the mapping function and holds the parameters while the learning algorithm updates the parameters to help the model satisfy the objective.

ML may generally be divided into broad categories such as supervised learning, unsupervised learning and reinforcement learning. Supervised learning involves presenting a machine learning model with training data consisting of inputs and outputs labelled by assessors, where the objective is to train the machine learning model such that it learns a general rule for mapping inputs to outputs. Unsupervised learning involves presenting the machine learning model with unlabeled data, where the objective is for the machine learning model to find a structure or hidden patterns in the data. Reinforcement learning involves having an algorithm evolving in a dynamic environment guided only by positive or negative reinforcement.

Non-limiting examples of ML models include neural networks (including deep learning (DL) neural networks), decision trees, support vector machines (SVMs), Bayesian networks, and genetic algorithms.

Neural Networks (NNs)

Neural networks (NNs), also known as artificial neural networks (ANNs) are a class of non-linear models mapping from inputs to outputs and comprised of layers that can potentially learn useful representations for predicting the outputs. Neural networks are typically organized in layers, which are made of a number of interconnected nodes that contain activation functions. Patterns may be presented to the network via an input layer connected to hidden layers, and processing may be done via the weighted connections of nodes. The answer is then output by an output layer connected to the hidden layers. Non-limiting examples of neural networks includes: perceptrons, back-propagation, hopfield networks.

Multilayer Perceptron (MLP)

A multilayer perceptron (MLP) is a class of feedforward artificial neural networks. A MLP consists of at least three layers of nodes: an input layer, a hidden layer and an output layer. Except for the input nodes, each node is a neuron that uses a nonlinear activation function. A MLP uses a supervised learning technique called backpropagation for training. A MLP can distinguish data that is not linearly separable.

Convolutional Neural Network (CNN)

A convolutional neural network (CNN or ConvNet) is a NN which is a regularized version of a MLP. A CNN uses convolution in place of general matrix multiplication in at least one layer.

Recurrent Neural Network (RNN)

A recurrent neural network (RNN) is a NN where connection between nodes form a directed graph along a temporal sequence. This allows it to exhibit temporal dynamic behavior. Each node in a given layer is connected with a directed (one-way) connection to every other node in the next successive layer. Each node (neuron) has a time-varying real-valued activation. Each connection (synapse) has a modifiable real-valued weight. Nodes are either input nodes (receiving data from outside the network), output nodes (yielding results), or hidden nodes (that modify the data from input to output).

Gradient Boosting

Gradient boosting is one approach to building an ML model based on decision trees, whereby a prediction model in the form of an ensemble of trees is generated. The ensemble of trees is built in a stage-wise manner Each subsequent decision tree in the ensemble of decision trees focuses training on those previous decision tree iterations that were "weak learners" in the previous iteration(s) of the decision trees ensemble (i.e. those that are associated with poor prediction/high error).

Generally speaking, boosting is a method aimed at enhancing prediction quality of the ML model. In this scenario, rather than relying on a prediction of a single trained algorithm (i.e. a single decision tree) the system uses many trained algorithms (i.e. an ensemble of decision trees), and makes a final decision based on multiple prediction outcomes of those algorithms.

In boosting of decision trees, the ML model first builds a first tree, then a second tree, which enhances the prediction outcome of the first tree, then a third tree, which enhances the prediction outcome of the first two trees and so on. Thus, the ML model in a sense is creating an ensemble of decision trees, where each subsequent tree is better than the previous, specifically focusing on the weak learners of the previous iterations of the decision trees. Put another way, each tree is built on the same training set of training objects, however training objects, in which the first tree made "mistakes" in predicting are prioritized when building the second tree, etc. These "tough" training objects (the ones that previous iterations of the decision trees predict less accurately) are weighted with higher weights than those where a previous tree made satisfactory prediction.

Examples of deep learning ML models include: Deep Boltzmann Machine (DBM), Deep Belief Networks (DBN), Convolutional Neural Network (CNN), and Stacked Auto-Encoders.

Examples of ensemble ML models include: Random Forest, Gradient Boosting Machines (GBM), Boosting, Bootstrapped Aggregation (Bagging), AdaBoost, Stacked Generalization (Blending), and Gradient Boosted Regression Trees (GBRD).

Examples of NN ML models include: Radial Basis Function Network (RBFN), Perceptron, Back-Propagation, and Hopfield Network Examples of Regularization ML models include: Ridge Regression, Least Absolute Shrinkage and Selection Operator (LASSO), Elastic Net, and Least Angle Regression (LARS).

Examples of Rule system ML models include: Cubist, One Rule (OneR), Zero Rule (ZeroR), and Repeated Incremental Pruning to Produce Error Reduction (RIPPER).

Examples of Regression ML models include: Linear Regression, Ordinary Least Squares Regression (OLSR), Stepwise Regression, Multivariate Adaptive Regression Splines (MARS), Locally Estimated Scatterplot Smoothing (LOESS), and Logistic Regression.

Examples of Bayesian ML models include: Naive Bayes, Averaged One-Dependence Estimators (AODE), Bayesian Belief Network (BBN), Gaussian Naive Bayes, Multinomial Naive Bayes, and Bayesian Network (BN).

Examples of Decision Trees ML models include: Classification and Regression Tree (CARD), Iterative Dichotomiser 3 (103), C4.5, C5.0, Chi-squared Automatic Interaction Detection CCHAID), Decision Stump, Conditional Decision Trees, and M5.

Examples of Dimensionality Reduction ML models include: Principal Component Analysis (PCA), Partial Least Squares Regression (PLSR), Sammon Mapping, Multidimensional Scaling (MDS), Projection Pursuit, Principal Component Regression (PCR), Partial Least Squares Discriminant Analysis, Mixture Discriminant Analysis (MDA), Quadratic Discriminant Analysis (QDA), Regularized Discriminant Analysis (RDA), Flexible Discriminant Analysis (FDA), and Linear Discriminant Analysis (LOA).

Examples of Instance Based ML models include: k-Nearest Neighbour (kNN), Learning Vector Quantization (LVQ), Self-Organizing Map (SOM), Locally Weighted Learning (LWL).

Examples of Clustering ML models include: k-Means, k-Medians, Expectation Maximization, and Hierarchical Clustering.

In the context of the present specification, the terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the present technology," unless expressly specified otherwise. A reference to "another embodiment" or "another aspect" in describing an embodiment does not imply that the referenced embodiment is mutually exclusive with another embodiment (e.g., an embodiment described before the referenced embodiment), unless expressly specified otherwise.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document may include the document itself (i.e. its contents), or it may be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
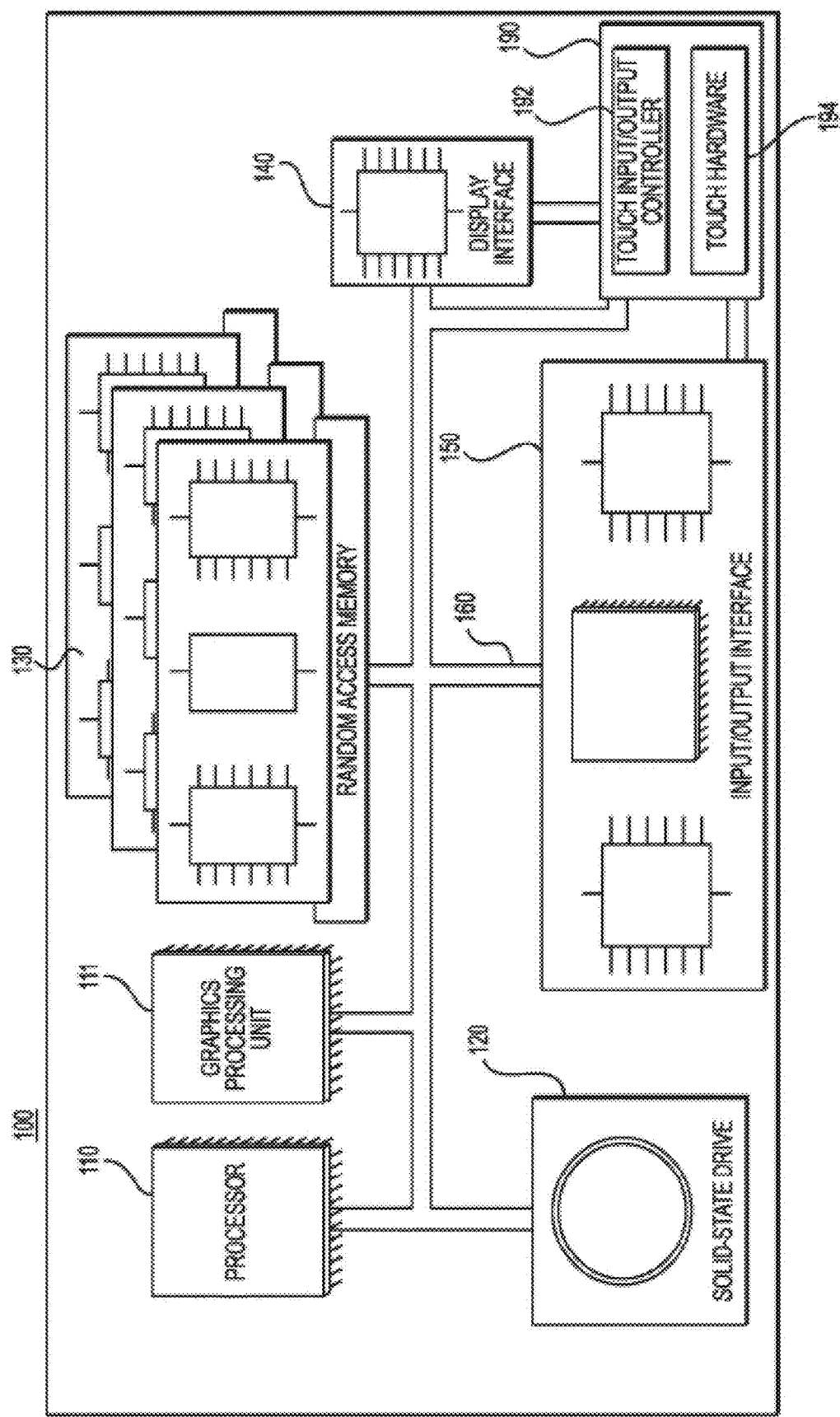
FIG. 1 depicts a schematic diagram of an electronic device in accordance with one or more non-limiting embodiment of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, some non-limiting examples will now be described to illustrate various implementations of aspects of the present technology.

Electronic Device

Referring to FIG. 1, there is shown an electronic device 100 suitable for use with one or more implementations of the present technology, the electronic device 100 comprises various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In one or more embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In one or more embodiments, the input/output interface 150 may be connected to a keyboard (not shown), a mouse (not shown) or a trackpad (not shown) enabling the user to interact with the electronic device 100 in addition or in replacement of the touchscreen 190.

According to one or more implementation of the present technology, the solid-state drive 120 stores program instructions suitable for being loaded into the random-access memory 130 and executed by the processor 110 and/or the GPU 111 for training a KB VQA model. For example, the program instructions may be part of a library or an application.

The electronic device 100 may be implemented as a server, a desktop computer, a laptop computer, a tablet, a smartphone, a personal digital assistant or any device that may be configured to implement the present technology, as it may be understood by a person skilled in the art.

System

Figure 2:
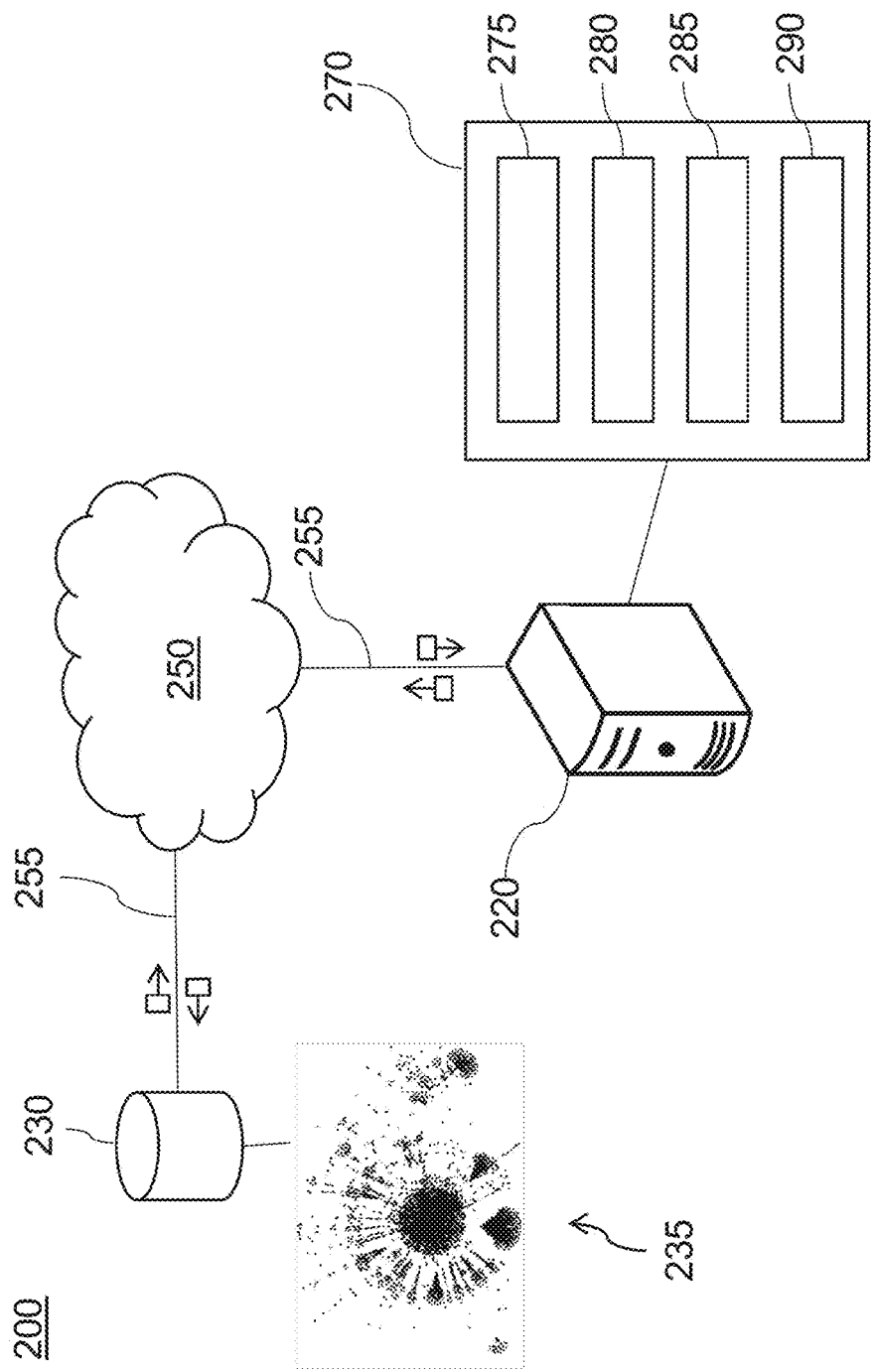
FIG. 2 depicts a schematic diagram of a system in accordance with one or more non-limiting embodiment of the present technology.

Referring now to FIG. 2, there is shown a schematic diagram of a system 200, the system 200 being suitable for implementing one or more non-limiting embodiments of the present technology. It will be appreciated that the system 200 as shown is merely an illustrative implementation of the present technology. Thus, the description thereof that follows is intended to be only a description of illustrative examples of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art will appreciate, other modifications are likely possible. Further, where this has not been done (i.e., where no examples of modifications have been set forth), it should not be interpreted that no modifications are possible and/or that what is described is the sole manner of implementing that element of the present technology. As a person skilled in the art will understand, this is likely not the case. In addition, it will be appreciated that the system 200 may provide in certain instances simple implementations of one or more embodiments of the present technology, and that where such is the case they have been presented in this manner as an aid to understanding.

The system 200 comprises inter alia a server 220, and a database 230, communicatively coupled over a communications network 250 via respective communication links 255.

Server

The server 220 is configured to inter alia: (i) obtain a given image from a set of images; (ii) process the given image to obtain a set of labelled objects; (iii) generate a scene graph of the image based on the set of labelled objects, the scene graph encoding at least one relation between two objects of the set of labelled objects; (iv) access a knowledge graph; (v) generate an augmented scene graph of the image by using the knowledge graph; (vi) receive a set of questions and an associated set of answers related to the image; (vii) train, based on the augmented scene graph, the set of questions and the associated set of answers, a KB VQA ML model 290 to provide an answer in response to a question; and (vii) train the KB VQA ML model 290 to provide a subgraph of the knowledge graph as a potential explanation for the answer, the subgraph having been used to generate the answer. To achieve that purpose, the server 220 has access to a plurality of ML models 270.

How the server 220 is configured to do so will be explained in more detail herein below.

It will be appreciated that the server 220 can be implemented as a conventional computer server and may comprise at least some of the features of the electronic device 100 shown in FIG. 1. In a non-limiting example of one or more embodiments of the present technology, the server 220 is implemented as a Dell™ PowerEdge™ Server running the Microsoft™ Windows Server™ operating system. Needless to say that the server 220 may be implemented in any other suitable hardware and/or software and/or firmware or a combination thereof. In the shown non-limiting embodiment of present technology, the server 220 is a single server. In one or more alternative non-limiting embodiments of the present technology, the functionality of the server 220 may be distributed and may be implemented via multiple servers (not shown).

The implementation of the server 220 is well known to the person skilled in the art. However, the server 220 comprises a communication interface (not shown) configured to communicate with various entities (such as the database 230, for example and other devices potentially coupled to the communication network 250) via the network. The server 220 further comprises at least one computer processor (e.g., the processor 110 of the electronic device 100) operationally connected with the communication interface and structured and configured to execute various processes to be described herein.

Plurality of Machine Learning (ML) Models

The server 220 has access to a plurality of ML models 270.

The plurality of ML models 270 include inter alia an object detection ML model 275, a scene graph generation ML model 280, a word embedding ML model 285, and a KB VQA ML model 290. It will be appreciated that each of the object detection ML model 275, the scene graph generation ML model 280, and the word embedding ML model 285 may comprise one or more ML models.

In one or more embodiments, the server 220 may execute one or more of the plurality of ML models 270. In another embodiment, one or more the plurality of ML models 270 is executed by another server (not depicted), and the server 220 accesses the one or more of the plurality of ML models 270 for training or for use by connecting to the server (not shown) via an API (not depicted), and specify parameters of the one or more of the plurality of ML models 270, transmit data to and/or receive data from the one or more of the plurality of ML models 270, without directly executing the one or more of the plurality of ML models 270.

As a non-limiting example, one or more of the plurality of ML models 270 may be hosted on a cloud service providing a machine learning API. Non-limiting examples of such services include Amazon™ machine learning API, BigML™, PredictionIO™, Google Cloud™ API, IBM™ Watson™ Discovery API, Kairos™ API, Microsoft™ Azure™ Cognitive Services, Prediction™ 10, and TensorFlow™ API.

In one or more embodiments, the object detection ML model 275 is part of the scene graph generation ML model 280.

Database

The database 230 is communicatively coupled to the server 220 via the communications network 250 but, in one or more alternative implementations, the database 230 may be communicatively coupled to the server 220 without departing from the teachings of the present technology. Although the database 230 is illustrated schematically herein as a single entity, it will be appreciated that the database 230 may be configured in a distributed manner, for example, the database 230 may have different components, each component being configured for a particular kind of retrieval therefrom or storage therein.

The database 230 may be a structured collection of data, irrespective of its particular structure or the computer hardware on which data is stored, implemented or otherwise rendered available for use. The database 230 may reside on the same hardware as a process that stores or makes use of the information stored in the database 230 or it may reside on separate hardware, such as on the server 220. The database 230 may receive data from the server 220 for storage thereof and may provide stored data to the server 220 for use thereof.

In one or more embodiments of the present technology, the database 230 is configured to inter alia: (i) store a set of images for training, validating, and testing the KB VQA ML model 290; (ii) store a knowledge graph 235; (iii) store a set of questions and set of answers related to each given image of the set of images; and (iv) store parameters related to the plurality of ML models 270.

It will be appreciated that at least some information stored in the database 230 may be predetermined by an operator and/or collected from a plurality of external resources.

In one or more embodiments, the database 230 stores the knowledge graph 235, which is a representation of information in the form of a graph, the graph including a set of nodes connected by a set of edges. The knowledge graph 235 has been generated based on an ontology defining the types of nodes in the set of nodes, and the type of edge relations.

In one or more embodiments, the knowledge graph 235 is stored in the form of triples, where each triple includes a head entity, a tail entity, and a predicate. The head entity corresponds to a given node, the tail entity to another given node, and the predicate corresponds to a relation between the head entity and the tail entity, which corresponds to an edge type in the knowledge graph 235. In one or more embodiments, the knowledge graph 235 comprises or is associated with at least semantic types of relations between entities.

Communication Network

In one or more embodiments of the present technology, the communications network 250 is the Internet. In one or more alternative non-limiting embodiments, the communication network 250 may be implemented as any suitable local area network (LAN), wide area network (WAN), a private communication network or the like. It will be appreciated that implementations for the communication network 250 are for illustration purposes only. How a communication link 255 (not separately numbered) between the server 220, the database 230, and/or another electronic device (not shown) and the communications network 250 is implemented will depend inter alia on how each electronic device is implemented.

Explainable Knowledge-Based Visual Question Answering

Figure 3:
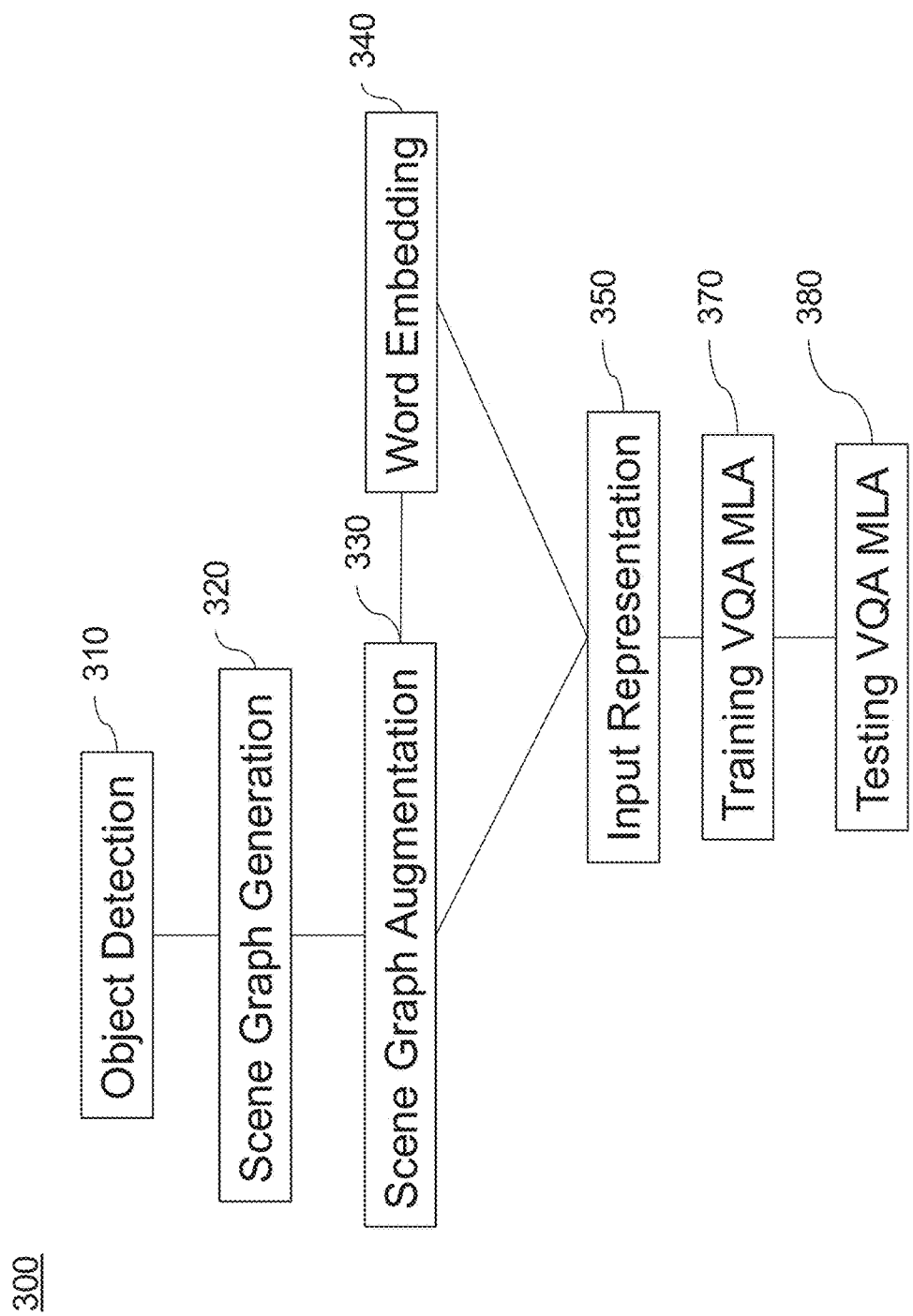
FIG. 3 depicts a schematic diagram of an explainable knowledge-based (KB) visual question answering (VQA) training procedure in accordance with one or more non-limiting embodiment of the present technology.
Figure 4:
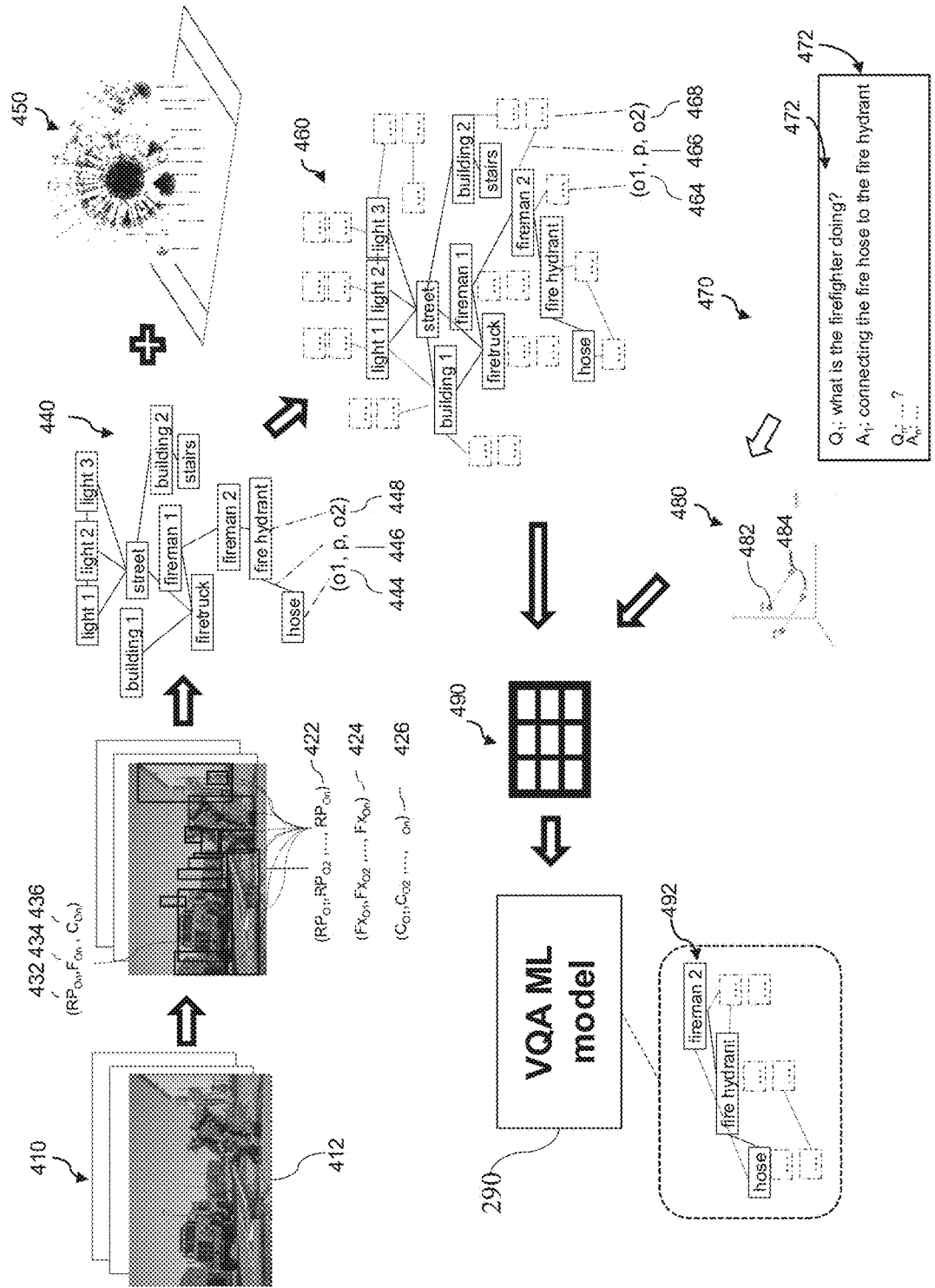
FIG. 4 depicts a schematic diagram of inputs and outputs of the KB VQA training procedure of FIG. 3 in accordance with one or more non-limiting embodiment of the present technology.

With reference to FIG. 3 and FIG. 4, there is shown respectively a schematic diagram of an explainable knowledge-based (KB) visual question answering (VQA) training procedure 300, and a schematic diagram of inputs and outputs of the explainable KB VQA training procedure 300 in accordance with one or more non-limiting embodiments of the present technology.

The explainable KB VQA training procedure 300 comprises inter alia an object detection procedure 310, a scene graph generation procedure 320, a scene graph augmentation procedure 330, a word embedding procedure 340, an input representation procedure 350 and a VQA ML model training procedure 370, and a VQA ML model testing procedure 380.

In one or more embodiments of the present technology, the server 220 executes the explainable KB VQA training procedure 300. In alternative embodiments, the server 220 may execute at least a portion of the explainable KB VQA training procedure 300, and one or more other servers (not shown) may execute other portions of the explainable KB VQA training procedure 300. In another embodiment, the second server 240 executes at least a portion of the explainable KB VQA training procedure 300.

Object Detection

The object detection procedure 310 is configured to inter alia: (i) receive the given image 412 from the set of images 410; (ii) determine a set of regions proposals 422 indicative of a set of objects in the given image 412; (iii) extract, for each region proposal 432 of the set of region proposals 422, a respective region feature vector 434 to obtain a set of region feature vectors 424; and (iv) classify, based on the set of region feature vectors 424, each object of the set of objects, to obtain a set of labelled objects 426.

In one or more embodiments, the object detection procedure 310 has access to the object detection ML model 275 having been trained to generate set of labelled objects 426 from an input image 412. As a non-limiting example, the object detection ML model 275 may be a pretrained Faster R-CNN (FRCNN) model.

In one or more other embodiments, the object detection procedure 310 uses one or more other ML models having been trained for object detection and classification. As a non-limiting example, the object detection procedure 310 may use a first ML model having been trained for detecting region proposals or bounding boxes, a second ML model having been trained for extracting features from portions of images may be used, and a third ML model having been trained for classifying objects based on bounding boxes and extracted features to obtain the set of labelled objects 426.

It will be appreciated that the object detection ML model 275 has been previously trained to detect and classify objects in images by the server 220 or by another server. In another embodiment, the server 220 may train the object detection ML model 275 to detect objects on a specific dataset of images before executing the object detection procedure 310.

In one or more embodiments, the object detection procedure 310 generates, for the given image 412, the set of regions of interests (ROIs) or region proposals 422 in the form of a set of bounding boxes, which are indicative of a respective location of each respective potential object in the given image 412. It will be appreciated that known techniques may be used for generating the set of region proposals 422 based on image features of the given image 412. In one or more embodiments, the object detection procedure 310 generates the set of region proposals 422 via a deep fully convolutional neural network (CNN).

In one or more embodiments, the object detection procedure 310 outputs a confidence score associated with each of the set of regions proposals 422. As a non-limiting example, each bounding box may be a rectangular box with coordinates of the bounding box in the given image 412, and a size of the bounding box.

The object detection procedure 310 extracts, for each region proposal 432 of the set of regions proposals 422, a respective feature vector 434. It will be appreciated that that various techniques known in the art for extracting features from regions proposals in images may be used for generating the respective feature vector 434.

The object detection procedure 310 obtains a set of feature vectors 424 associated with the set of regions proposals 422 for the given image 412. The set of regions proposals 422 correspond to a set of detected objects.

The object detection procedure 310 classifies the respective region proposal 432 based on the respective feature vector 434, to obtain a prediction of the respective label 436 indicative of the type of object. The respective object label 436 is part of an object label distribution. The object detection procedure 310 obtains, based on the set of feature vectors 424 and the set of region proposals 422, a set of labelled objects 426 for the given image 412. For the given image 412, each region proposal 432 indicative of an object is associated with a respective feature vector 434 and a respective object label 436.

In one or more embodiments, the object detection procedure 310 generates the set of labelled objects 426 via a region proposal network (RPN).

The object detection procedure 310 is configured to repeat the process for each given image 412 of the set of images 410.

Scene Graph Generation

The scene graph generation procedure 320 is configured to inter alia: (i) obtain the set of labelled objects 426, each object being associated with the respective region proposal 432, the respective feature vector 434 and the respective label 436; (ii) determine one or more of spatial relations and semantic relations between the set of labelled objects 426; and (iii) generate a scene graph 440 of the image 412, the scene graph 440 encoding spatial features, semantic features and relational features of the set of labelled objects 426.

In one or more embodiments, the scene graph generation procedure 320 is performed by a scene graph generation ML model 280 having been pretrained for generating scene graphs from images and/or set of labelled objects. As a non-limiting example, the scene graph generation ML model 280 is LinkNet.

In one or more embodiments, the scene graph generation ML model 280 performs relational embedding for modelling inter-dependency between objects in the set of labelled objects 426, geometric layout encoding to provide classification of the relations between objects in the set of labelled objects 426, and global context encoding for providing contextual information for the set of labelled objects 426.

In one or more embodiments, the scene graph generation procedure 320 constructs a relation-based representation for each region proposal 432 output by the object detection procedure 310 by utilizing the object feature vectors 422 from the underlying RPN, the set of feature vectors 424 and label distribution of the set of labelled objects 426. The scene graph generation procedure 320 obtains, for the given image 410, object proposal features. The scene graph generation procedure 320 may generate the object-relational embedding where features from one object region will attend to the features from all the object regions. The scene graph generation procedure 320 then stacks all object proposals to build a matrix. The scene graph generation procedure 320 computes relation-aware embedded features in the matrix to obtain the scene graph 440.

The scene graph 440 is a topological representation of a scene in the given image 412 in the form of a graph, which encodes object instances, corresponding object categories, and relationships between the objects in the set of labelled objects 426. Each node of the scene graph 440 is represented by the respective region proposal 434 or bounding boxing and the corresponding object label 436, and where an edge with an edge label represents a relationship predicate between a given subject node and a given object node.

Each respective object label 436 may be associated with a respective object type. In one or more embodiments, the respective object label 436 and respective object type are encoded as semantic features in the scene graph 440.

The scene graph 440 encodes at least one of visual features, semantic features and spatial features of each object of the set of labelled objects 426.

The scene graph 440 encodes at least one type relation 446 between at least two objects 444, 448 of the set of labelled objects 426, which may be a semantic relation between two objects 444, 448, a spatial relation between the two objects 444, 448, and a visual feature relation between two objects 444, 448. In one or more embodiments, the scene graph 440 encodes only spatial type of relations between the at least two objects 444, 448 of the set of labelled objects 426.

The spatial type of relations between two objects include relative location and/or relative scale information of the two objects.

A non-limiting example of the relative location of the at least two objects may include that a first object is above/below/at the right of/behind/in front of the second object which may be represented as a triple (object_1, left_of, object_2) for example and may further include an associated relative distance. A non-limiting example of the relative scale relation between at least two objects may include that a first object is bigger/smaller/equal to a second object and may include the associated relative size.

The scene graph generation procedure 320 outputs, for each given image 412 of the set of images 410, the scene graph 440.

Scene Graph Augmentation

The scene graph augmentation procedure 330 receives as an input, for each given image 412, the scene graph 440.

The scene graph augmentation procedure 330 is configured to inter alia augment the scene graph 440 using the knowledge graph 235 to obtain the augmented scene graph 460.

The scene graph augmentation procedure 330 obtains at least a portion of the knowledge graph 235 from the database 230 or from another electronic device storing the knowledge graph 235.

In one or more embodiments, the scene graph augmentation procedure 330 embeds, by using the word embedding procedure 340, at least a portion of the obtained knowledge graph 235 to obtain the embedded knowledge graph 450 such that is represented in the same embedding space as the scene graph 440. The scene graph augmentation procedure 330 then adds the embedded portion of the obtained knowledge graph 235 to the scene graph 440 to obtain the augmented scene graph 460.

In one or other embodiments, the scene graph augmentation procedure 330 obtains the embedded knowledge graph 450 from the database 230.

The purpose of the scene graph augmentation procedure 330 is to enrich the scene graph 440 of the given image 412, which is indicative of spatial features, semantic features and relational features of the set of labelled objects 426, with one or more of additional spatial features, additional semantic features, and additional relational features present in the knowledge graph 235, i.e. the scene graph augmentation procedure 330 adds, to the scene graph 440, a set of additional objects from the embedded knowledge graph 450, the set of additional objects comprising at least one additional object 468 and at least one additional type of relation 466 between the additional object 468 and a given object 464 of the scene graph 440. The at least one type of additional relation 446 may be a type of relation that is not originally present in the scene graph 440. As a non-limiting example, the additional object 468 may be semantic concept related to a given object 464 of the scene graph, and the type of additional relation 446 may be the semantic type.

In one or more embodiments, the scene graph 440 is represented as an embedded set of triples, and the embedded knowledge graph 450 is represented as an embedded set of additional triples. As a non-limiting example, the scene graph augmentation procedure 330 may concatenate the scene graph 440 with the embedded knowledge graph 450 to obtain the augmented scene graph 460.

In one or more embodiments, the additional object 468 may be a semantic concept related to a given object 464 of the scene graph, and the type of additional relation 446 may be a semantic type of relation. As a non-limiting example, the semantic type of relation may be one of: a synonymy type of relation, an antonymy type of relation (including complementary, relation and gradable or scalar antonyms), a homonymy type of relation, a hyponymy type of relation, a polysemy type of relation, a metonymy type of relation, a paraphrase, ambiguity type of relation and a collocation type of relation.

The scene graph augmentation procedure 330 outputs, for each given image 412 of the set of images 410, the augmented scene graph 460.

Word Embedding

The word embedding procedure 340 is configured to inter alia: (i) obtain, for each given image 412, a set of questions and an associated set of answers 470 related to the given image 412; and (ii) generate, for each given question 472 and corresponding answer 474 in the set of questions and associated set of answers 470, an embedded question 482 and a corresponding associated embedded answer 484 to form the set of embedded questions and embedded answers 480, The set of questions and the associated set of answers 470 are text-based digital items which may have been provided by assessors, or may be obtained from a dataset. The set of questions and the associated set of answers 470 relate to one or more of the set of labelled objects 426 in the given image 412.

As a non-limiting example, the set of questions and the associated set of answers 470 and the set of images 410 may have been obtained from a training dataset comprising the set of images 410 and the set of questions and the associated set of answers 470.

In one or more embodiments, the word embedding procedure 340 obtains the set of questions and the associated set of answers 470 by providing an indication of the set of images 410 to the database 230 or to another electronic device (not depicted). In one or more alternative embodiments, the word embedding procedure 340 obtains the set of questions and the associated set of answers 470 from another electronic device (not depicted) connected over the communications network 250.

The word embedding procedure 340 is executed by using the word embedding ML model 285. The word embedding ML model 285 models complex characteristics of word use including syntax and semantics, as well as linguistic context of the word use. In the context of the present technology, the word embedding procedure 340 performs contextualized word embeddings.

The word embedding procedure 340 generates, for each question 472 and associated answer 474 in the set of questions and the associated set of answers 470, the respective embedded question 482 and an associated respective embedded answer 484, i.e. the word embedding procedure 340 tokenizes each question 472 and associated answer 474. In one or more embodiments, the respective embedded question 482 and the respective embedded answer 486 are assigned a representation that is function of the entire input sentence. In one or more embodiments, the respective embedded question 482 and the associated respective embedded answer 484 are embeddings from language models (ELMo) representations.

It will be appreciated that known algorithms may be used and combined to generate word embeddings. Non-limiting examples of algorithms or models used to generate word embeddings include Word2vec, Stanford University's GloVe, AllenNLP's Elmo, fastText, Gensim, Indraand Deeplearning4j, Principal Component Analysis (PCA) and T-Distributed Stochastic Neighbour Embedding (t-SNE).

The word embedding procedure 340 outputs, for each given image 412 of the set of images 410, the set of embedded questions and the set of embedded answers 480.

Input Representation

The input representation procedure 350 is configured to inter alia: (i) obtain the augmented scene graph 460 of the given image 412; (ii) obtain the set of embedded questions and associated set of embedded answers 480; and (ii) generate embeddings of the augmented scene graph 460 and the set of embedded questions and associated set of embedded answers 480 to obtain the embedded QA augmented scene graph 490, which is to be provided for training the KB VQA ML model 290

In one or more embodiments, the input representation procedure 350 is executed by using a ML model.

The input representation procedure 350 obtains the augmented scene graph 460 and the set of embedded questions and associated set of embedded answers 480 from the word embedding procedure 340 and the scene graph augmentation procedure 330, which may be stored in the database 230 or from another electronic device (not depicted). The input representation procedure 350 represents the augmented scene graph 460 and the set of embedded questions and associated set of embedded answers 480 in the same embedding space, such that similarity between elements in the augmented scene graph 460 and the set of embedded questions and associated set of embedded answers 480, may be assessed by the VQA ML model 290, as an example by evaluating a distance in the embedding space.

In one or more embodiments, the input representation procedure 350 generates, for each embedded question 482, a concatenation of the information augmented scene graph 460, which is indicative of language features, visual features, and other types of additional features.

The input representation procedure 350 outputs the embedded QA augmented scene graph 490 which represents the augmented scene graph 460 and the set of embedded questions and associated set of embedded answers 480 in a single embedding space.

Training of the VQA ML Model

The VQA ML model training procedure 370 is configured to inter alia: (i) receive as an input the embedded QA augmented scene graph 490 for the given image 412; (ii) train the VQA ML model 290 to generate an answer 474 in response to a given question 472 related to the given image 412 based on the embedded QA augmented scene graph 490; (iii) train the VQA ML model 290 to provide an explanation for the answer 474 in response to the question 472 by retrieving a respective subgraph 492 from the embedded QA augmented scene graph 490.

The VQA ML model training procedure 370 is performed on at least a portion of the set of images 410.

In one or more alternative embodiments, the VQA ML model training procedure 370 may receive the augmented scene graph 460 and the set of embedded questions and associated set of embedded answers 480 to train the KB VQA ML model 290 without going through the input representation procedure 350.

The VQA ML model training procedure 370 initializes the KB VQA ML model 290 with a set of hyperparameters. In one or more embodiments, the KB VQA ML model 290 is implemented using a deep neural network architecture. As a non-limiting example, the KB VQA ML model 290 may be implemented as a hybrid neural network configured to process text and images through encoding and decoding layers which capture the text and image embedding representations.

The VQA ML model training procedure 370 trains the KB VQA ML model 290 to provide an answer 474 in response to a given question 472 from the set of questions and the associated set of answers 470 by using the augmented scene graph 460. To achieve that purpose, the VQA ML model training procedure 370 trains the KB VQA ML model 290 on the embedded VQA augmented scene graph 490.

In one or more embodiments, the KB VQA ML model 290 evaluates and links the semantic features of the question 472 (represented by the embedded question 482) to a given object in the augmented scene graph 460, and evaluates and links semantic features of the answer 474 (represented by the embedded answer 484) to another given object in the augmented scene graph 460. The KB VQA ML model 290 learns how the given object linked to the embedded question 482 is related to the other given object linked to the embedded answer 484 in the embedded QA augmented scene graph 490. The KB VQA ML model 290 thus learns a path in the augmented scene graph 460 from one or more nodes related to the question 472 to other nodes related to the answer 474, which defines a subgraph 492.

Thus, the answer 474 may be linked to the question 472 via one or more of spatial features and spatial type of relation, semantic features and semantic type of relation, and visual features and visual type of relation represented in the same embedding space, i.e. the embedded QA augmented scene graph 490. The KB VQA ML model 290 may evaluate similarity of objects corresponding to vectors based on a distance between vectors in the embedding space of the QA augmented scene graph 490.

In one or more embodiments, during the VQA ML model training procedure 370, the KB VQA ML model 290 learns to retrieve the subgraph 492 of the augmented scene graph 460, where the subgraph 492 comprises at least a portion of the question 472 and at least a portion of the answer 474. The subgraph enables understanding how the answer 474 is related to the question 472 in the augmented scene graph 460, and may be provided as a potential explanation for the answer, i.e. the subgraph 492 shows the behavior of the KB VQA ML model 290 and enables interpreting the answer 474.

It will be appreciated that explanations may be composed by using a conjunction, a disjunction or a composition of other explanations, i.e. a subgraph 492 may be a conjunction, a disjunction or a composition of two or more subgraphs. Thus, the KB VQA ML model 290 is trained to provide the answer 474 to the question 472, as well as a potential explanation to the question in the form of the subgraph.

It will be appreciated that the KB VQA ML model 290 may provide a set of subgraphs, where each subgraph may be a potential explanation. In one or more embodiments, the KB VQA ML model 290 learns to rank the subgraphs based on the known answers.

In one or more embodiments, the VQA ML model training procedure 370 stores each subgraph 492 in the database 230.

It will be appreciated that natural language processing (NLP) techniques may be used to provide a human-readable explanation for the answer based on the subgraph 492.

In one or more embodiments, the VQA ML model training procedure 370 comprises a validation procedure for validating and fine-tuning the set of hyperparameters of the KB VQA ML model 290.

The VQA ML model training procedure 370 outputs the trained VQA ML model 290.

Testing of the VQA ML Model

The testing VQA ML model procedure 380 is configured to inter alia: (i) obtain the trained KB VQA ML model 290; (ii) obtain a set of test images; (iii) obtain a set of test questions; (iv) test the trained KB VQA ML model 290 to provide an answer to a question related to a given test image in the set of test image.

The KB VQA ML model procedure 380 enables evaluating the performance of the trained KB VQA ML model 290 on unseen images and/or unseen questions.

During the testing VQA ML model procedure 380, a test image and associated test questions related to the test image are obtained.

The testing VQA ML model procedure 380 provides the test image to the object detection procedure 310 and the scene graph generation procedure 320 to obtain a test scene graph.

The testing VQA ML model procedure 380 provides the associated test question to the word embedding procedure 640 to obtain the associated embedded test question.

In one or more embodiments, the test scene graph is provided to the scene graph augmentation procedure 330, which obtains, based on the embedded knowledge graph 450, a test augmented scene graph.

The testing VQA ML model procedure 380 provides the test augmented scene graph and the associated embedded test question as an input to the trained VQA ML model 290, which jointly embeds the augmented test scene graph and the associated test question embeddings.

The testing VQA ML model procedure 380 outputs an answer and one or more associated subgraph as a potential explanation to the answer.

It will be appreciated that explanations may be provided as conjunctions, disjunctions or composition of other subgraphs.

The VQA ML model training procedure 370 outputs the trained VQA ML model 290.

Method Description

Figure 5:
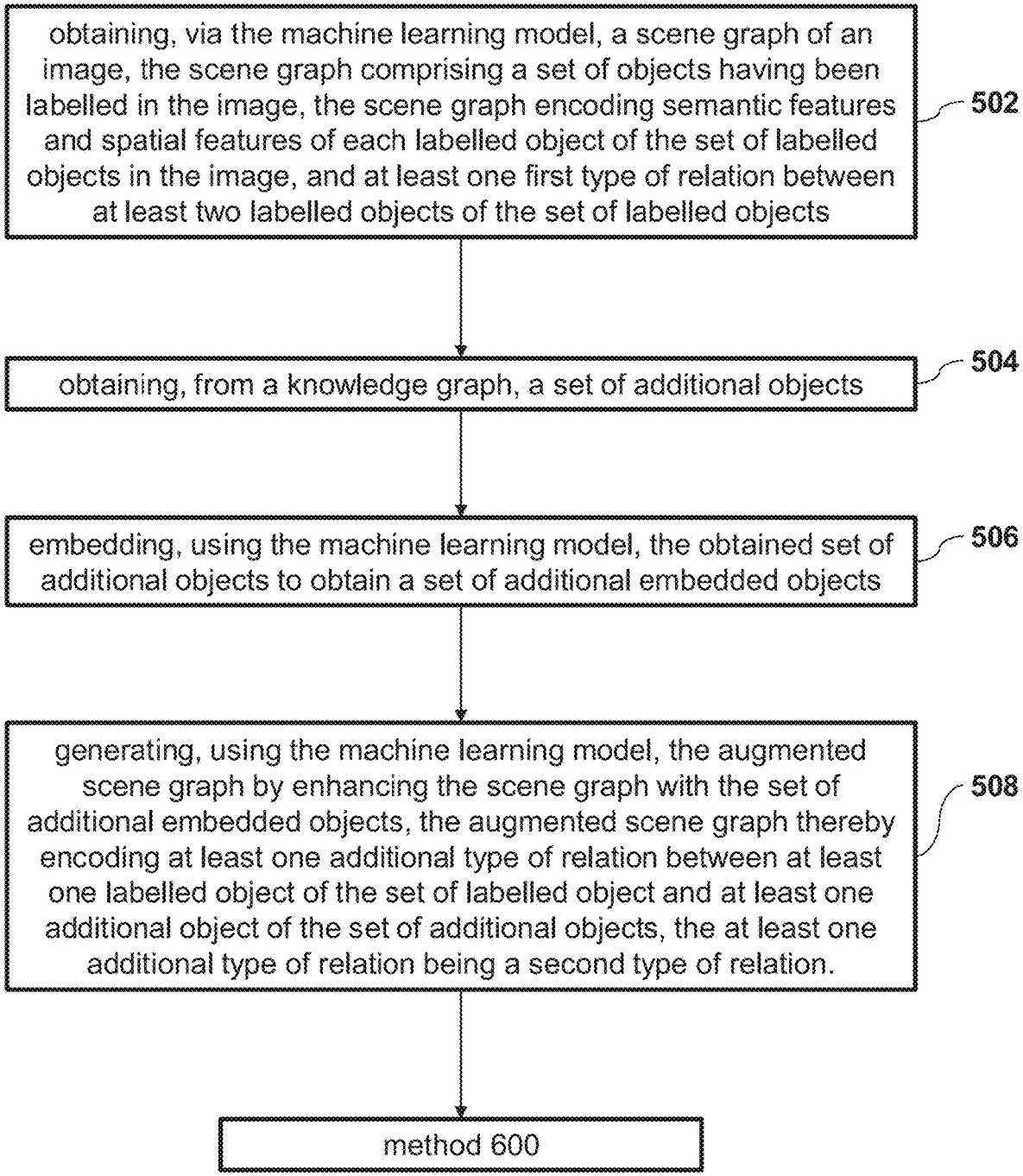
FIG. 5 depicts a flow chart of a method for generating an augmented scene graph of a given image in accordance with one or more non-limiting embodiment of the present technology

FIG. 5 depicts a flowchart of a method 500 for generating an augmented scene graph, the method 500 being executed in accordance with one or more non-limiting embodiments of the present technology.

The server 220 has access to the plurality of ML models 270 including, the object detection ML model 275, the graph scene generation ML model 280, the word embedding ML model 285, and the KB VQA ML model 290.

In one or more embodiments, the server 220 comprises a processing device such as the processor 110 and/or the GPU 111 operatively connected to a non-transitory computer readable storage medium such as the solid-state drive 120 and/or the random-access memory 130 storing computer-readable instructions. The processor 110, upon executing the computer-readable instructions, is configured to execute the method 500.

The method 500 starts at processing step 502.

According to processing step 502, the server 220 obtains, via the object detection ML model 275 and the scene graph generation ML model 280, a scene graph 440 of a given image 412, the scene graph 440 comprising the set of labelled objects 426 having been detected in the given image 412, the scene graph 440 encoding semantic features and spatial features of each labelled object in the set of labelled objects 426, and at least one type of relation between at least two detected objects in the set of labelled objects 426, the at least one type of relation comprising at least one of a semantic relation and a spatial relation.

In one or more embodiments, prior to obtaining the scene graph 440, the server 220 accesses the object detection ML model 275 to determine a set of regions proposals 422 indicative of a set of objects in the given image 412, extract a respective region feature vector 434 for each region proposal 432 to obtain a set of region feature vectors 424 and to classify, based on the set of region feature vectors 424, each object of the set of objects, to obtain a set of labelled objects 426.

According to processing step 504, the server 220 obtains, from a knowledge graph 235, based on at least a portion of the scene graph 440, a set of additional objects. In one or more embodiments, the set of additional objects comprise at least a portion of the objects and relations present in the knowledge graph 235. In one or more embodiments, the set of additional objects are represented as a set of triples.

According to processing step 506, the server 220 accesses the word embedding ML model 285 and embeds the set of additional objects of the knowledge graph 235 to obtain the embedded knowledge graph 450, which comprises a set of additional embedded objects.

According to processing step 508, the server 220 generates the augmented scene graph 460 based on the scene graph 440 and the embedded knowledge graph 450. The server 220 adds, to the scene graph 440, a set of additional objects from the embedded knowledge graph 450, the set of additional objects comprising at least one additional object 468 and at least one additional type of relation 466 between the additional object 468 and a given object 464 of the scene graph 440. The at least one type of additional relation 446 may be a type of relation that is not originally present in the scene graph 440.

The method 500 then ends.

The method 500 is used to generate scene graph of images which are augmented by external knowledge sources such as knowledge graphs. The augmented scene graph may be used for a variety of graph-related tasks such as improving predictive abilities of link-prediction machine learning models.

Figure 6:
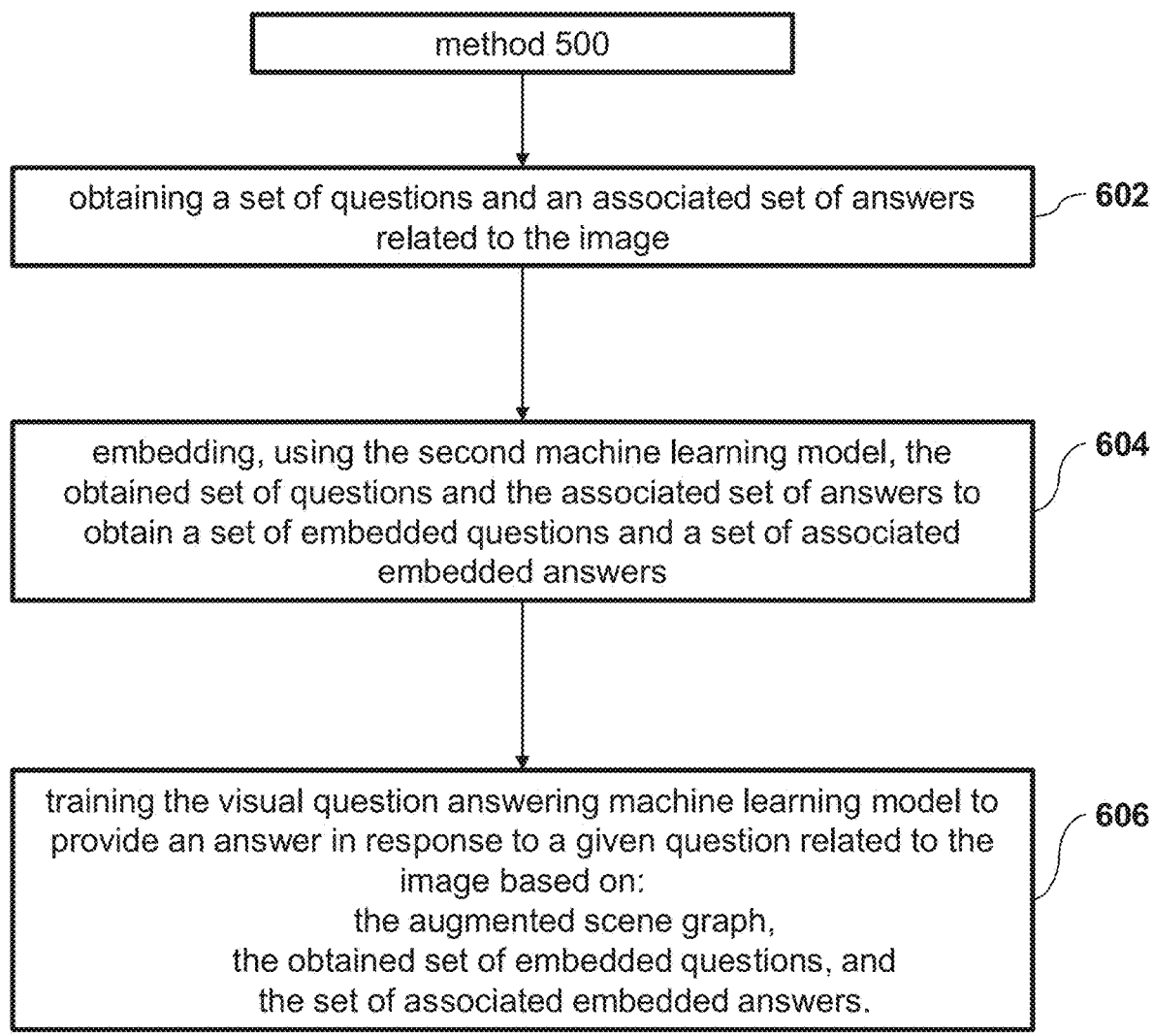
FIG. 6 depicts a flow chart of a method for training a VQA ML model for providing an answer in response to a given question related to the given image in accordance with one or more non-limiting embodiment of the present technology

FIG. 6 depicts a flowchart of a method 600 for training a VQA ML model, the method 600 being executed in accordance with one or more non-limiting embodiments of the present technology.

In one or more embodiments, the server 220 comprises a processing device such as the processor 110 and/or the GPU 111 operatively connected to a non-transitory computer readable storage medium such as the solid-state drive 120 and/or the random-access memory 130 storing computer-readable instructions. The processor 110, upon executing the computer-readable instructions, is configured to execute the method 600.

The method 600 may be executed after execution of the method 500.

The method 600 starts at processing step 602.

According to processing step 602, the server 220 obtains, for each given image 412, a set of questions and an associated set of answers 470 related to the given image 412.

According to processing step 604, the server 220 accesses the word embedding ML model 285 to generate, for each given question 472 and corresponding answer 474 and in the set of questions associated set of answers 470, an embedded question 482 and an associated embedded answer 484 to obtain a set of embedded questions and a set of embedded answers 480.

According to processing step 606, the server 220 trains the KB VQA ML model 290 to provide an answer 474 in response to a given question 472 from the set of questions and the associated set of answers 470 related to the given image 412. The server 220 trains KB VQA ML model 290 on a joint embedding of the augmented scene graph 460 and the set of embedded questions and associated set of embedded answers 480. The KB VQA ML model 290 evaluates and links the semantic features of the question 472 (represented by the embedded question 482) to a given object in the augmented scene graph 460, and evaluates and links semantic features of the answer 474 (represented by the embedded answer 484) to another given object in the augmented scene graph 460. The KB VQA ML model 290 learns how the given object linked to the embedded question 482 is related to the other given object linked to the embedded answer 484 in the embedded VQA augmented scene graph 490. The KB VQA ML model 290 thus learns a path in the augmented scene graph 460 from one or more nodes related to the question 472 to other nodes related to the answer 474, which defines a subgraph 492.

In one or more embodiments, prior to processing step 606, the server 220 embeds the augmented scene graph 460 and the set of embedded questions and associated set of embedded answers 460 in the same embedding space such that similarity between elements in the augmented scene graph 460 and the set of embedded questions and associated set of embedded answers 460 may be assessed.

The method 600 then ends.

It will be appreciated that at least one or more embodiments of the present technology aim to expand a range of technical solutions for addressing a particular technical problem, namely improving performance of deep neural networks used for visual question answering, by providing a potential explanation to the answers output by the, which enables interpretability of the answers and the deep neural network, and which may in turn be less prone to errors and enable saving computational resources.

It will be appreciated that not all technical effects mentioned herein need to be enjoyed in each and every embodiment of the present technology. For example, one or more embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting.

The invention claimed is:

1. A method for generating an augmented scene graph of an image, the method being executed by a processor, the processor having access to:
a machine learning model having been trained to generate scene graph of images based on features thereof,
the method comprising:
obtaining, via the machine learning model, a scene graph of an image, the scene graph comprising a set of objects having been labelled in the image, the scene graph encoding:
semantic features and spatial features of each labelled object of the set of labelled objects in the image, and
at least one first type of relation between at least two labelled objects of the set of labelled objects;
obtaining, from a knowledge graph, based on at least a portion of the scene graph, a set of additional objects;
embedding, using the machine learning model, the obtained set of additional objects to obtain a set of additional embedded objects; and
generating, using the machine learning model, the augmented scene graph by enhancing the scene graph with the set of additional embedded objects, the augmented scene graph thereby encoding at least one additional type of relation between at least one labelled object of the set of labelled objects and at least one additional object of the set of additional objects, the at least one additional type of relation being a second type of relation.

2. A method for training a visual question answering machine learning model based on the augmented scene graph of claim 1, wherein
the machine learning model is a first machine learning model; wherein the processor has access to:
a second machine learning model having been trained to generate word embeddings, and
the visual question answering machine learning model; and wherein the method further comprises:
obtaining a set of questions and an associated set of answers related to the image;
embedding, using the second machine learning model, the obtained set of questions and the associated set of answers to obtain a set of embedded questions and a set of associated embedded answers; and
training the visual question answering machine learning model to provide an answer in response to a given question related to the image based on:
the augmented scene graph,
the obtained set of embedded questions, and
the set of associated embedded answers.

3. The method of claim 2, wherein
the method further comprises, prior to the obtaining of the scene graph of the image:
obtaining the image, the image having image features; and
detecting, using the first machine learning model, based on the image features, the set of labelled objects, each labelled object having respective spatial features, respective semantic features, and respective object features; and
embedding, using the second machine learning model, based on the respective spatial features, the respective semantic features, and the respective object features, the set of labelled objects to obtain the scene graph of the image.

4. The method of claim 3, wherein
the semantic features comprise: an object label, and an object type; and wherein the spatial features comprise: a size of the object, and a location of the object.

5. The method of claim 4, wherein
the at least one first type of relation comprises a spatial relation; and wherein the second type of relation comprises a semantic relation.

6. The method of claim 5, wherein the augmented scene graph of the image further encodes respective object features of each labelled object, the respective object features comprising respective visual features.

7. The method of claim 6, wherein a given relation between objects in a pair of objects is represented as an edge, the edge having an edge label indicative of a type of relation.

8. The method of claim 7, wherein the training of the visual question answering machine learning model to provide the answer in response to the given question comprises:
training the visual question answering machine learning model to retrieve at least one subgraph of the augmented scene graph, the subgraph comprising the answer.

9. The method of claim 8, further comprising providing an indication of the at least one subgraph as a potential explanation for the answer.

10. The method of claim 9, wherein:
the first machine learning model comprises a deep convolutional neural network and a region proposal network (RPN); wherein
the second machine learning model comprises a long short term memory (LSTM) network; and wherein
the visual question answering machine learning model comprises a deep neural network.

11. A method for training a visual question answering machine learning model, the method being executed by a processor, the processor having access to:
a first machine learning model having been trained to generate scene graph of images based on features thereof,
a second machine learning model having been trained to generate word embeddings, and
the visual question answering machine learning model, the method comprising:
obtaining, via the first machine learning model, a scene graph of an image, the scene graph comprising a set of objects having been labelled in the image, the scene graph encoding
semantic information and spatial information of each labelled object of the set of labelled objects in the image, and
at least one type of relation between at least two labelled objects of the set of labelled objects;
obtaining, from a knowledge graph, based on at least a portion of the scene graph, a set of additional objects;
embedding, using the first machine learning model, the obtained set of additional objects to obtain a set of additional embedded objects; and
generating, using the first machine learning model, the augmented scene graph by enhancing the scene graph with the set of additional embedded objects, the augmented scene graph thereby encoding at least one additional type of relation between at least one labelled object of the set of labelled object and at least one additional object of the set of additional objects;
obtaining, via the second machine learning model, a set of embedded questions and a set of associated embedded answers, the set of embedded questions and the set of associated embedded answers having been generated from a set of questions and a set of associated answers related to the image; and
training the visual question answering machine learning model to provide an answer in response to a given question related to the image based on:
the augmented scene graph,
the set of embedded questions, and
the set of associated embedded answers.

12. A system for generating an augmented scene graph of an image, the system comprising a processor, the processor having access to:
a machine learning model having been trained to generate scene graph of images based on features thereof,
the processor being operatively connected to a non-transitory storage medium comprising instructions,
the processor, upon executing the instructions, being configured for:
obtaining, via the machine learning model, a scene graph of an image, the scene graph comprising a set of objects having been labelled in the image, the scene graph encoding:
semantic features and spatial features of each labelled object of the set of labelled objects in the image, and
at least one first type of relation between at least two labelled objects of the set of labelled objects;
obtaining, from a knowledge graph, based on at least a portion of the scene graph, a set of additional objects;
embedding, using the machine learning model, the obtained set of additional objects to obtain a set of additional embedded objects; and
generating, using the machine learning model, the augmented scene graph by enhancing the scene graph with the set of additional embedded objects, the augmented scene graph thereby encoding at least one additional type of relation between at least one labelled object of the set of labelled objects and at least one additional object of the set of additional objects, the at least one additional type of relation being a second type of relation.

13. A system for training a visual question answering machine learning model based on the augmented scene graph of claim 12, wherein
the machine learning model is a first machine learning model; wherein the processor has access to:
a second machine learning model having been trained to generate word embeddings, and
the visual question answering machine learning model; and wherein the processor is configured for:
obtaining a set of questions and an associated set of answers related to the image;
embedding, using the second machine learning model, the obtained set of questions and the associated set of answers to obtain a set of embedded questions and a set of associated embedded answers; and
training the visual question answering machine learning model to provide an answer in response to a given question related to the image based on:
the augmented scene graph,
the obtained set of embedded questions, and
the set of associated embedded answers.

14. The system of claim 13, wherein
the processor is further configured for, prior to the obtaining of the scene graph of the image:
obtaining the image, the image having image features; and
detecting, using the first machine learning model, based on the image features, the set of labelled objects, each labelled object having respective spatial features, respective semantic features, and respective object features; and embedding, using the second machine learning model, based on the respective spatial features, the respective semantic features, and the respective object features, the set of labelled objects to obtain the scene graph of the image.

15. The system of claim 14, wherein the semantic features comprise: an object label, and an object type; and wherein the spatial features comprise: a size of the object, and a location of the object.

16. The system of claim 15, wherein the first type of relation comprises a spatial relation; and wherein the second type of relation comprises a semantic relation.

17. The system of claim 16, wherein the training of the visual question answering machine learning model to provide the answer in response to the given question comprises:

training the visual question answering machine learning model to retrieve at least one subgraph of the augmented scene graph, the subgraph comprising the answer.

18. The system of claim 17, wherein the processor is further configured for providing an indication of the at least one subgraph as a potential explanation for the answer.

19. The system of claim 18, wherein the set of additional objects comprises object attributes of the at least one labelled object in the set of labelled objects.

20. The system of claim 19, wherein the first machine learning model comprises a deep convolutional neural network and a region proposal network (RPN); wherein the second machine learning model comprises a long short-term memory (LSTM) network; and wherein the visual question answering machine learning model a deep neural network.

* * * * *